(12) United States Patent
Schleicher (10) Patent No.: US 9,897,242 B2
(45) Date of Patent: Feb. 20, 2018

(54) TUBULAR LINER FOR SEWER REHABILITATION

(71) Applicant: Buergofol GmbH, Siegenburg (DE)

(72) Inventor: Franz Schleicher, Ingolstadt (DE)

(73) Assignee: BURGOFOL GMBH, Siegenburg (DE)

( * ) Notice: Subject to any disclaimer, the term of this patent is extended or adjusted under 35 U.S.C. 154(b) by 185 days.

(21) Appl. No.: 14/877,399

(22) Filed: Oct. 7, 2015

(65) Prior Publication Data
US 2016/0131298 A1     May 12, 2016

(30) Foreign Application Priority Data

Oct. 8, 2014   (DE) .................. 10 2014 114 627

(51) Int. Cl.
*F16L 55/16* (2006.01)
*F16L 55/165* (2006.01)
(Continued)

(52) U.S. Cl.
CPC .......... *F16L 55/1656* (2013.01); *B29C 63/06* (2013.01); *B32B 1/08* (2013.01); *B32B 5/02* (2013.01); *B32B 5/022* (2013.01); *B32B 5/024* (2013.01); *B32B 5/028* (2013.01); *B32B 5/22* (2013.01); *B32B 5/26* (2013.01); *B32B 7/045* (2013.01); *B32B 7/14* (2013.01); *B32B 25/042* (2013.01); *B32B 25/08* (2013.01);
(Continued)

(58) Field of Classification Search
CPC ............................ F16L 55/165; F16L 55/1656
USPC ...... 138/98, 97; 428/36.9, 36.91; 405/184.2, 405/150
See application file for complete search history.

(56) References Cited

U.S. PATENT DOCUMENTS 6,644,356 B1     11/2003   Connor et al.
6,679,966 B1 *    1/2004   Brandenburger ..... B29C 53/582
                                                          156/190
(Continued)

FOREIGN PATENT DOCUMENTS

DE       297 00 236 U1     5/1998
DE       102009041841 A1   7/2010
(Continued)

OTHER PUBLICATIONS

German Patent Office Search Report, dated Sep. 3, 2015.
European Patent Office Search Report, dated Feb. 25, 2016.

*Primary Examiner* — Patrick F Brinson
(74) *Attorney, Agent, or Firm* — Dority & Manning, P.A.

(57) ABSTRACT

A tubular liner for sewer rehabilitation an inner tubular film; a resin-carrier layer surrounding the inner tubular film; and a mechanically protective outer film system surrounding the resin-carrier layer. The outer film system has an outer film extending in the longitudinal direction of the tubular liner. Longitudinal edges of the outer film are connected to each other in an overlapping manner in the circumferential direction of the tubular liner with connecting points. Upon the elongation in the radial direction during the insertion of the tubular liner, the connection points are elongated and may break in a sewer to be rehabilitated. The outer film features at least one layer made of a material that is mechanically very stable and is essentially not able to elongate, and at least one layer that is essentially impermeable for UV radiation and visible light.

15 Claims, 3 Drawing Sheets

(51) Int. Cl.
| | |
|---|---|
| *B29C 63/06* | (2006.01) |
| *B32B 5/02* | (2006.01) |
| *B32B 5/22* | (2006.01) |
| *B32B 5/26* | (2006.01) |
| *B32B 7/04* | (2006.01) |
| *B32B 7/14* | (2006.01) |
| *B32B 25/04* | (2006.01) |
| *B32B 25/08* | (2006.01) |
| *B32B 25/10* | (2006.01) |
| *B32B 25/14* | (2006.01) |
| *B32B 27/08* | (2006.01) |
| *B32B 27/12* | (2006.01) |
| *B32B 27/30* | (2006.01) |
| *B32B 27/32* | (2006.01) |
| *B32B 27/34* | (2006.01) |
| *B32B 27/36* | (2006.01) |
| *B32B 1/08* | (2006.01) |

(52) U.S. Cl.
CPC .............. *B32B 25/10* (2013.01); *B32B 25/14* (2013.01); *B32B 27/08* (2013.01); *B32B 27/12* (2013.01); *B32B 27/302* (2013.01); *B32B 27/304* (2013.01); *B32B 27/306* (2013.01); *B32B 27/308* (2013.01); *B32B 27/32* (2013.01); *B32B 27/34* (2013.01); *B32B 27/36* (2013.01); *B32B 27/365* (2013.01); *B32B 2250/44* (2013.01); *B32B 2260/021* (2013.01); *B32B 2260/046* (2013.01); *B32B 2262/0269* (2013.01); *B32B 2262/101* (2013.01); *B32B 2270/00* (2013.01); *B32B 2307/40* (2013.01); *B32B 2307/4026* (2013.01); *B32B 2307/50* (2013.01); *B32B 2307/54* (2013.01); *B32B 2307/5825* (2013.01); *B32B 2307/71* (2013.01); *B32B 2307/718* (2013.01); *B32B 2597/00* (2013.01)

(56) References Cited

U.S. PATENT DOCUMENTS

| | | | |
|---|---|---|---|
| 8,361,580 B2* | 1/2013 | Stark | ..................... F16L 55/162 138/97 |
| 8,580,364 B2* | 11/2013 | Quitter | ..................... B32B 1/08 138/98 |
| 2003/0217777 A1 | 11/2003 | Williamson et al. | |
| 2005/0217747 A1 | 10/2005 | Buriak et al. | |
| 2006/0112998 A1 | 6/2006 | Smith | |
| 2010/0159167 A1 | 6/2010 | Schumacher | |
| 2011/0083765 A1* | 4/2011 | Stark | ..................... F16L 55/162 138/97 |
| 2013/0126029 A1 | 5/2013 | Hummel | |
| 2014/0076448 A1 | 3/2014 | Duttenhoefer | |
| 2014/0166148 A1* | 6/2014 | Stark | ........................ F16L 9/00 138/140 |
| 2014/0272231 A1* | 9/2014 | Stark | ........................ B32B 1/08 428/36.9 |

FOREIGN PATENT DOCUMENTS

| | | |
|---|---|---|
| DE | 102010023764 A1 | 12/2011 |
| DE | 102011105995 | 1/2013 |
| EP | 2 357 065 A1 | 8/2011 |
| EP | 2 740 587 A1 | 6/2014 |
| EP | 2 740 592 A2 | 6/2014 |
| WO | WO 99/11966 | 3/1999 |
| WO | WO 2012/159702 A1 | 11/2012 |
| WO | WO 2013/026568 | 2/2013 |

\* cited by examiner

TUBULAR LINER FOR SEWER REHABILITATION

The invention relates to a tubular liner for sewer rehabilitation.

BACKGROUND

Tubular liners for sewer rehabilitation have been known for a long time. Here, for example, glass fiber tubular liner systems with UV or steam curing are known, in which the pipe to be rehabilitated must introduce a thick-walled film made of PE with a high density (HDPE—high density polyethylene), which—in most cases in the cross-sectional shape of a semicircle—is applied on the inner wall of the pipe. Subsequently, a flexible insert tube (also called a "tubular liner" or simply a "liner") is drawn into the pipe to be rehabilitated (drawing-in process), whereas the insert tube slides over the sliding film. On the one hand, this prevents damage to the insert tube through the inner pipe wall or objects in the pipe; and on the other hand, the friction between the insert tube and sliding film is very low and facilitates the drawing in of the insert tube. Its functioning is similar to that of a shoehorn. With glass fiber tubular liner systems with UV or steam curing, such an insert tube (tubular liner) usually features an inner and an outer tube, between which a carrier material (for example, glass fibers), which is impregnated with reactive plastic resin, is introduced. For example, commercially available UP resins (polyester or unsaturated polyester resins), VE resins (vinyl ester resins) or EP resins (epoxy resins) are used as the reactive plastic resin. With UP or VE resins, the curing of the resins takes place, for example, with the aid of photoinitiators. However, curing may also take place thermally. The insert tube remains inflated in the pipe until it makes contact with the inner pipe wall or sliding film, in order to subsequently cure the resin—for example, with the aid of UV radiation from a UV radiation source slowly drawn out through the pipe. Finally, the inner film of the insert tube can be drawn out and removed. The layer with the carrier material is then exposed to the substances to be led through the pipe.

A tubular liner is known, for example, from WO 2012/159702. Thereby, for the combination of inner tubular film, resin-carrier layer and outer tubular film, a protective tube made of a tear-resistant material in the form of a truck tarpaulin material (that is, PVC-reinforced fabric) is arranged, which features a connecting section extending in the longitudinal direction of the tubular liner, which can be elongated by introducing compressed air into the tubular liner in the circumferential direction. With one embodiment, the protective tube made of tear-resistant, non-stretchable material features such a width that, upon the wrapping around of the outer tubular film, the two longitudinal edges do not abut each other or overlap. In order to bridge the gap (viewed in cross-section) that thus emerges between the longitudinal edges of the protective tube, a connecting film piece made of a stretchable material is provided, which is connected to such longitudinal edges of the protective tube. The premature curing of the resin is prevented by the fact the outer, mechanically fragile tubular film is formed in a manner impermeable for UV radiation, as is known from the state of the art.

SUMMARY OF THE INVENTION

A task of this invention to provide a tubular liner with improved functionality, with a simple structure and more favorable costs. Additional objects and advantages of the invention will be set forth in part in the following description, or may be obvious from the description, or may be learned through practice of the invention.

The advantages of the invention can be particularly seen in that the outer film system of the tubular liner in accordance with the invention is, on the one hand, very robust against mechanical effects and, on the other hand, prevents the premature curing of the resin (such as during storage) through the simultaneous formation as UV protective film. This dual function between mechanical strength and protection from premature curing enables a cost-effective arrangement of the tubular liner in accordance with the invention, with a simple design at the same time. In particular, based on its mechanical robustness, the tubular liner is able to be drawn into a sewer pipe to be rehabilitated, since the tubular liner slides on its robust (that is, mechanically highly durable) outer film system. Given the tear resistance and puncture resistance of the outer film system, tip projections and the like in the sewer pipe do not result in damage to the tubular liner. Since the at least one outer film completely encloses the resin-carrier system, the aforementioned advantages are present at each point of the tubular liner.

Either the outer film system features a single outer film, whereas its longitudinal edges overlap and are joined together in the overlap area. Or several (preferably two) outer films are provided; these partially overlap at their longitudinal edges, such that two overlapping areas are provided. Preferentially, the variant has two outer films.

Below, outer films are frequently discussed in the plural. Thereby, however, the variant with only one outer film should be included too.

The resistance to initial and further tears of the outer film(s) is very high; that is, the outer films are practically not able to be torn or, if they are torn, the effort needed for further tearing is very high. They also feature a very low to negligible elongation in the machine direction (md), that is, in production running direction of the film(s). In other words, a high force is necessary in the machine direction in order to ever create a certain elongation.

Overall, the outer films, which may feature a mono-layer or multi-layer structure, feature a high tear resistance, a high puncture resistance, a high abrasion resistance and an ability to elongate that is essentially not present or very low. Below, the preferred mechanical properties of the outer film(s) are reproduced, whereas the outer film—as explained below—may feature multiple different layers (including UV protection and a styrene barrier). Thereby, the tensile strength longitudinal to M in accordance with DIN EN ISO 527-3 is preferably greater than 20 N/mm$^2$, preferentially greater than 30 N/mm$^2$, most preferentially greater than 40 N/mm$^2$. The tensile strength transverse to M in accordance with DIN EN ISO 527-3 is preferably greater than 20 N/mm$^2$, preferentially greater than 30 N/mm$^2$, most preferentially greater than 40 N/mm$^2$. The elongation at break in a longitudinal direction ($\epsilon$B) and elongation at break in a transverse direction ($\epsilon$B) in accordance with DIN EN ISO 527-3 and DIN EN ISO 527-3 respectively is preferably less than 200%, preferentially less than 100%, most preferentially less than 50%. The resistance to further tears in a trapezoidal manner in a longitudinal direction or in a trapezoidal manner in a transverse direction in accordance with DIN 53363 and DIN 53363 respectively is preferably greater than 100 N, preferentially greater than 200 N. The puncture resistance in accordance with ASTM E 154 is preferably greater than 300 N, preferentially greater than 500 N, in particular preferentially greater than 800 N.

In particular preferentially, the outer films are formed in accordance with at least one arrangement from the following group:
- containing at least one olefin homopolymer or copolymer, preferably polyethylene (PE), in particular a high density polyethylene (HDPE);
- containing at least one polyester;
- containing at least one polyimide;
- containing at least one natural rubber, one hard rubber, one vulcanized rubber, one polystyrene, one high impact polystyrene (HIPS), one styrene-butadiene copolymer, one acrylonitrile-butadiene-styrene-(ter) polymer (ABS), one polycarbonate (PC), one poly (meth)acrylate, PVC, or a mixture or a blend of the aforementioned polymers or other copolymers, terpolymers made of the monomers of the aforementioned polymers;
- formed as a reinforced film, for example by a fabric, threads, fibers, grid, mesh;
- formed as a reinforced fabric, in particular a PVC-reinforced fabric.

With all of these embodiments, it is important that a high abrasion resistance, a high degree of robustness (i.e., a high mechanical stability), a high resistance to initial and further tears and very high puncture resistance of the outer films is realized.

For example, Hostalen® GD 4755 made by LyondellBasell Industries, with a density of 0.953 g/cm3, is mentioned as HDPE material that can be used in the outer films. The thickness is, for example, 300 μm.

A PVC-reinforced fabric (truck tarpaulins) that can be used may feature a thickness of 400 μm, with a surface weight of 600 g/m².

The at least one layer, which imparts the UV protection and, if necessary, protection against visible light, of the outer films of a tubular liner in accordance with the invention is preferably realized in the form of a UV/light protection film, which is applied (in particular, laminated) to an outer layer of the outer films. This outer layer is, for example, a predominantly polyester-containing layer or a PVC-reinforced fabric layer. The specified UV/light protection film is preferably a film that absorbs and/or reflects UV radiation and (advantageously) visible radiation (at least a part of the visible spectrum, advantageously short-wavelength visible light). Preferably, in this case, the UV radiation is at least partially absorbed and/or reflected in the wavelength range of 200 to 400 nm and the rays of visible light are at least partially absorbed and/or reflected in the wavelength range of 400 to 800 nm, preferably at greater than 90% and in particular preferentially at greater than 99%. In particular, a transmission in the wavelength range of 300 to 500 nm, preferably from 350 to 450 nm, is substantially to almost completely inhibited by the film, in particular at greater than 90% and in particular preferentially at greater than 99%. For this purpose, organic and/or inorganic color pigments, dyes and (if applicable) UV absorbers or compounds can be used; these are known to the specialist (see, for example, DE 10 2009 041 841 A1). Therefore, the UV/light protective film can be completely opaque, or it is transparent or at least contact-transparent.

Such a UV and (if applicable) light protective film is preferentially laminated on the side of the outer film turned towards the resin-carrier layer.

According to an embodiment that is quite preferential, such a laminated UV and (if applicable) light protective film may include additional chemical compounds that exert a barrier function against particular monomers, resins, oils, greases, gases, etc. In particular, polyamide may thereby be used in the UV/light protective film (for this purpose, see also below).

According to an advantageous embodiment, a film with such a barrier layer may be laminated, as an alternative or an addition to the UV or light protective film, on the outer films.

The following provides two examples of a UV/light protective film, whereas the chemicals that are used are commercially available:

Example 1: Silver Film with UV Absorbers; Color Batch: Grafe 13-08485

| Layer number | Composition | Proportion in layer by % wt | Thickness in μm |
|---|---|---|---|
| 1 | Luvofilm 9679 | 0.5 | 35 |
|   | Lupolen 2420 F | 79.5 | |
|   | Silver color batch | 20 | |
| 2 | Mitsui Admer NF 498 E bonding agent | 96 | 12 |
|   | Constab UVA 01490 LD UV absorber | 4 | |
| 3 | Durethan C 38 F | 100 | 26 |
| 4 Same as 2 | Mitsui Admer NF 498 E bonding agent | 96 | 12 |
|   | Constab UVA 01490 LD UV absorber | 4 | |
| 5 Same as 1 | Luvofilm 9679 | 0.5 | 35 |
|   | Lupolen 2420 F | 79.5 | |
|   | Silver color batch | 20 | |
|   | | | Total thickness: 130 μm |

Example 2: Silver Film with UV Absorber: Color Batch: Grafe 13-08486

| Layer number | Composition | Proportion in layer by % wt. | Thickness in μm |
|---|---|---|---|
| 1 | Luvofilm 9679 | 0.5 | 35 |
|   | Lupolen 2420 F | 79.5 | |
|   | Silver color batch | 20 | |
| 2 | Mitsui Admer NF 498 E bonding agent | 96 | 12 |
|   | Constab UVA 01490 LD UV absorber | 4 | |
| 3 | Durethan C 38 F | 100 | 26 |
| 4 Same as 2 | Mitsui Admer IMF 498 E bonding agent | 96 | 12 |
|   | Constab UVA 01490 LD UV absorber | 4 | |
| 5 Same as 1 | Luvofilm 9679 | 0.5 | 35 |
|   | Lupolen 2420 F | 79.5 | |
|   | Silver color batch | 20 | |
|   | | | Total thickness 130 μm |

The outer films preferably feature a thickness in the range of 50 to 10,000 μm, preferentially 100 to 5000 μm, in particular preferentially 200 μm to 1000 μm.

The connecting points (also considered as the "junction") between the overlapping longitudinal edges of only one used outer film or between the longitudinal edges of multiple outer films are particular preferentially formed as predetermined breaking points. Upon the radial elongation of the tubular liner when inflated after being inserted into the sewer pipe to be rehabilitated, the predetermined breaking points break and the longitudinal edges of the outer film(s) shift to each other in the circumferential direction. Since the curing process begins shortly thereafter, any gaps that may thereby emerge do not leak in a significant quantity.

The overlapping longitudinal edges of the outer films are preferably connected to each other by means of, where applicable, double-sided tape, a thermal welding seam, a hot-melt adhesive or another adhesive in the form of a continuous adhesive seam or an interrupted adhesive application. A bond may take place, for example, by means of a commercially available 2K PUR adhesive. Other examples can be found in the aforementioned WO 2012/159702. Standard fabric tape, duct tape or packaging tape (for example, 50 m×38 mm, silver) may also be used.

It is preferential if the connecting points in the overlapping areas are sealed to components of the resin, such that the components of the resin cannot leak at any point of the outer film system.

In a particular embodiment, on the side directed to the resin-carrier layer, at least one outer film, preferably all outer films, laminates a material, such as a fleece, that is absorbent for resin or liquid. This material then lies directly opposite the resin-carrier layer and enables a better bonding of the resin. Instead of laminating, for example, the material (such as a fleece) may also be tacked. The specialist is familiar with the methods for bonding films with materials that can absorb resins and liquids.

According to one alternative, at least one additional separate (i.e., not laminated) film is arranged between the outer films and the resin-carrier layer. This may be, for example, a wrapping film, which is wound around the resin-carrier system. It is also possible that this is at least one film of a covering film. According to an advantageous embodiment, a fleece or a non-woven material is applied on the additional film—to the side of the resin-carrier system. The thickness of this film is preferably 10 to 1000 µm, while the fleece or the non-woven material features a surface weight of preferably 5 g/m$^2$ to 500 g/m$^2$.

The at least one additional film may also be formed as a barrier film with very good adhesion to the resin. At that point, a fleece (or a material that is generally absorbent for liquids and resins) is not necessary.

The at least one additional film (protective film, wrapping film) may be, for example, a 50µ PE-PA-PE film with the following structure: PE 10 µm, bonding agent 5 µm, PA 10 µm, bonding agent 5 µm, PE 10 µm, laminated on a 50 g/m$^2$ fleece. The application weight may amount to 15 g/m$^2$.

The at least one additional film may be applied by wrapping the resin-carrier layer. Alternatively, the at least one additional film may be in the form of a flat film, which is wrapped around the resin carrier and is subsequently fused. Moreover, a tubular film or a tube-shaped composite made of film/non-woven material is conceivable as the at least one additional film. The purpose of this at least one additional film is to protect the reactive resin, so that it cannot leak into the environment.

Preferably, a polyamide is included as a styrene barrier in at least one film, which is arranged around the resin-carrier system. According to a preferred embodiment, polyamide may be included, in particular, in one layer of the outer films. Thereby, the polyamide component in this layer amounts to, for example, greater than 50% by weight. According to one alternative, in one layer of the aforementioned at least one additional film, polyamide is included in sufficient quantity so that such layer can serve as a styrene barrier.

In this regard, it is preferential if at least one layer of the outer films is formed as a barrier layer against components of the reactive resin.

A particularly preferential embodiment of the tubular liner in accordance with the invention features outer films that feature the specified mechanical robustness and stability, are largely impermeable against UV radiation and (if applicable) visible light and feature a barrier against styrene. In addition, a fleece or a non-woven material may be arranged to the side of the resin-carrier layer.

According to an advantageous embodiment, that outer film which is provided for application on the sewer pipe bottom covers in a circumferential direction an angular range of greater than 180°, for example, of greater than 240°. At an angular range of 180°, the two longitudinal edges of such outer film are preferably located on the same level horizontally. Upon the drawing of the tubular liner in accordance with the invention into the sewer pipe to be rehabilitated, the tubular liner then slides on this lower outer film through the sewer pipe bottom.

Preferably, an upper outer film, viewed in cross-section, is provided, which covers in a circumferential direction an angular range of less than 180° and is placed from above on a lower outer film and is connected to this on the edge side to form an overlap. This upper outer film is then a type of cover for one or more lower outer films. Between the upper and lower outer film, the connecting points are then located above the loading points when drawing the tubular liner into a sewer pipe.

Below, the preferential condition of the inner tubular film of the tubular liner in accordance with the invention is briefly addressed. In contrast to the outer film system, this must feature very good permeability to UV radiation and shorter wavelength radiation and visible light. Thus, the curing process is enabled; this is carried out by a UV radiation source with the tubular liner inflated in the pipe, which is pulled through at the inner side of the tubular liner, thus within the inner tubular film.

In addition, the inner tubular film must not burst when pressurized, and must feature a good ability to elongate, in order to be able to place the tubular liner in the sewer.

The inner tubular film may be formed, for example, according to EP 2 740 592 A or EP 2 740 587 A.

An exemplary structure of an inner tubular film may appear as follows:

| Layer number | Composition | Proportion in layer in % | Thickness in µm |
| --- | --- | --- | --- |
| (1) | Durethan C38 F | 88 | 40 |
|  | Durethan B40 FAM | 12 |  |
| (2) | Bonding agent: Admer NF 498 E | 100 | 10 |
| (3) | Lupolen 2420 F | 70 | 65 |
|  | Exceed 1327 CA | 30 |  |
| (4) | Bonding agent: Admer NF 498 E | 100 | 10 |
| (5) | Lupolen 2420 F | 70 | 75 |
|  | Exceed 1327 CA | 30 |  |

Total thickness: 200 µm

The aforementioned systems are possible, for example, as resin-carrier systems. The carrier system may be designed, for example, in the form of glass fibers.

From the above statements, it is clear that the outer films may feature applied films, whereas, for example, a thermal lamination, an extrusion lamination, an adhesive lamination, a calendering or other methods known to the specialist for connecting films together or films with fleece or non-woven material or a material absorbent for liquids and resins may be used. Such a connection can be realized between a UV/light protective film with a mechanically robust (that is, mechanically very stable) film or such a fabric. Moreover, the UV/light protective film and a fleece or non-woven material may be connected in such a manner, whereas this combination is then, together with the mechanically robust film applied to it, a component of the outer film system in accordance with the invention.

BRIEF DESCRIPTION OF THE DRAWINGS

Two different embodiments of the invention are schematically presented in the figures. The following is shown.

DETAILED DESCRIPTION

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

Figure 1:
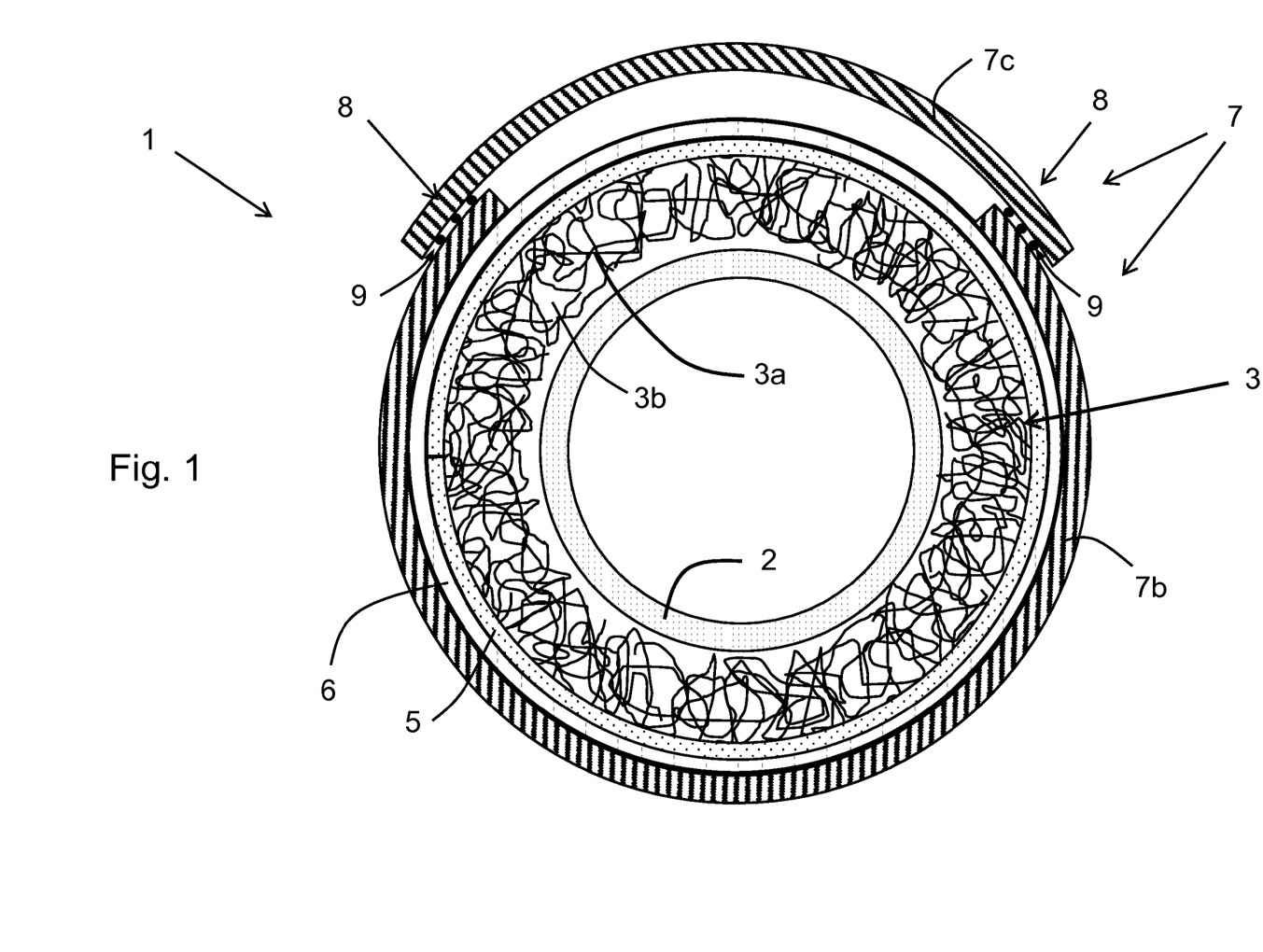
FIG. 1 a first embodiment of a tubular liner in accordance with the invention with two outer films and a separate additional film with laminated fleece, in cross-section.

FIG. 1 shows a first embodiment of a tubular liner 1 in accordance with the invention for lining a sewer pipe to be rehabilitated. The tubular liner 1 comprises an inner tubular film 2, a resin-carrier layer 3 and an additional film 6 surrounding the resin-carrier layer 3. In principle, the inner tubular film 2 is known from the state of the art, whereas various versions exist. It may contain different layers, whereas, in particular, there is a permeability for UV radiation, in order to lead the UV radiation source through the cavity in the longitudinal direction of the tubular liner 1 formed by the inner tubular film 2, and thereby dry the reactive resin 3b that is curable by UV radiation.

Glass fibers, for example, are used as the carrier material 3a of the resin-carrier layer 3. Reactive plastics resins, which are known to the specialist from the area of pipe rehabilitation, are possible as reactive resins 3b.

The additional film 6 is laminated on its side with a fleece 5 facing the resin-carrier layer 3. The additional film 6 may feature, in particular, one or more barrier layers, in particular polyamide, in order to prevent the styrene derived from the resin from escaping from the resin-carrier layer 3. Moreover, additional barrier chemicals, for example EVOH, may be contained in the single-layer or multi-layer film 6.

An outer film system 7, which in the present case comprises two outer films 7b, 7c, is arranged around the additional film 6. The lower outer film extends in an angular range of approximately 270°, whereas its two longitudinal edges 8 are located on approximately the same horizontal level. On the longitudinal edges 8 of the film 7b, an upper outer film 7c is placed, which spans an angular range of approximately 120°. The longitudinal edges 8 of the two outer films 7b, 7c are connected to each other at the three longitudinal adhesive seams extending into the image plane, which in this manner form connecting points 9.

In order to establish the connecting points 9, many different bonding techniques (for example, double-sided adhesive tape) can be used. It is important that, upon the inflation of the tubular liner 1 (after being inserted into the sewer to be rehabilitated in an unpressurized state), the longitudinal edges 8 can shift against each other; that is, that the connecting points 9 can elongate and possibly break. The connecting points 9 then act as predetermined breaking points.

The overlapping areas with the connecting points 9 are preferentially sealed to components of the resin.

This provision of the elongation in the circumferential direction (upon the application of radial pressure from the inside) is important, since the outer films 7b, 7c feature at least one mechanically very robust layer. It is meant by this that the outer films feature a high abrasion resistance, a high degree of robustness, a high resistance to initial and further tears and a high puncture resistance, since they are pulled through the sewer pipe and, after inflation, rest on the sewer pipe wall, and are thus exposed to very high mechanical loads. The mechanical robustness thus protects the tubular liner 1 from damage or destruction.

The specified at least one layer of the outer films 7b, 7c may be realized, for example, by an HDPE film, a film with a polyester component of greater than 50% by weight or a reinforced fabric, for example a PVC-coated fabric (such as a truck tarpaulin).

When overlapped, the longitudinal edges 8 of the film 7b may also be located above the longitudinal edges 8 of the film 7c. It is also possible that one of the two longitudinal edges 8 of the film 7b is located above the respective longitudinal edge 8 of the film 7c, and that the other longitudinal edge of the film 7b is located below it.

The outer films 7b, 7c also feature at least one layer that is essentially impermeable for UV radiation and (if applicable) visible light. For this purpose, this layer contains, for example, organic and/or inorganic color pigments, dyes and (if applicable) UV absorbers or compounds, which are known to the specialist, for example, from DE 10 2009 041 841 A1. In particular, it is preferential that a transmission in the wavelength range of 300 to 500 nm, preferentially from 350 to 450 nm, is substantially to almost completely inhibited by the at least one layer, in particular at greater than 90% and in particular preferentially at greater than 99%.

The specified at least one layer of the outer films 7b, 7c is preferably laminated in the form of a UV/light protection film on the specified at least one mechanically robust layer of the outer films 7b, 7c, preferably by the side turned towards the interior of the tubular liner.

Figure 2:
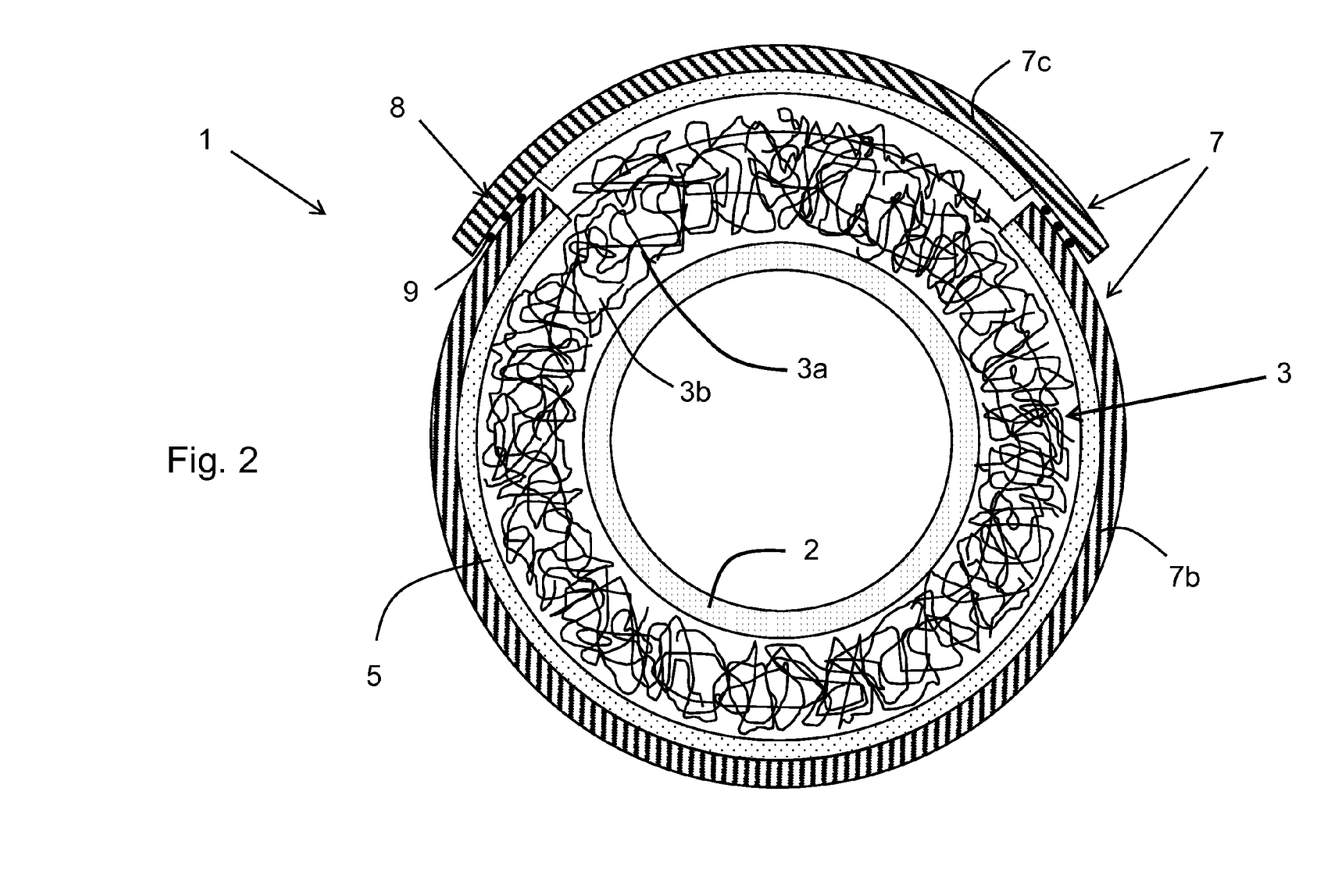
FIG. 2 a second embodiment of a tubular liner in accordance with the invention with two outer films and fleece laminated on the two outer films, in cross-section, and FIG. 3 a second embodiment of a tubular liner in accordance with the invention with only one outer film and laminated fleece, in cross-section.

In FIG. 2, in which the same reference signs have been used for the same or comparable features, a second tubular liner 1 in accordance with the invention is shown in cross-section, whereas the difference consists of the fact that no additional film (film 6 in FIG. 1) is provided. Rather, a fleece 5 is laminated on the outer films 7b, 7c turned towards the interior of the tubular liner. Thereby, the fleece is preferably laminated on the specified UV/light protective film.

The variant shown in FIG. 2 has the advantage that a separate film 6, which is always used in all known systems, is not necessary. Rather, the outer film system 7 is present;

this realizes the mechanical resistance, the UV protection and (if applicable) the protection against UV radiation and near-visible light along with the bonding of the resin to the fleece 5. In addition, a barrier function with respect to styrene in particular can be realized by means of a polyamide layer inserted into the outer films 7b, 7c. On the whole, a tubular liner 1 with a relatively simple structure that is very cost-effective as a whole and meets all requirements is realized.

Figure 3:
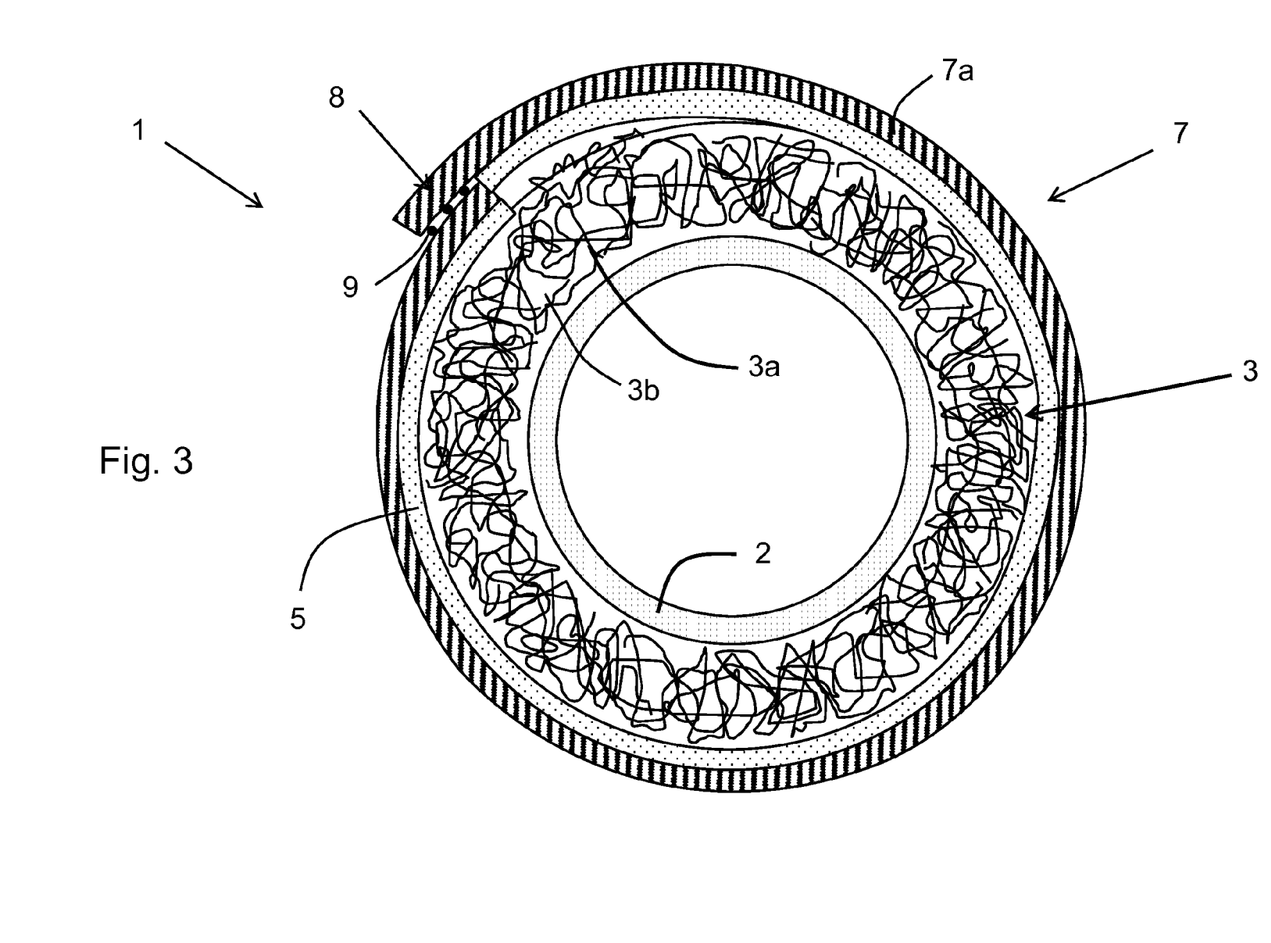

FIG. 3 finally presents a third embodiment of a tubular liner 1 in accordance with the invention. Thereby, the outer film system 7 includes only one single outer film 7a, which is arranged in such a manner that it overlaps its two longitudinal edges 8. Moreover, three adhesive seams that are perpendicular to the image plane and extend lengthwise along the tubular liner 1, which upon the radial elongation of the tubular liner 1, elongate in the circumferential direction and possibly ultimately break, are provided; these form a connecting point 9. With this variant, a second outer film is not provided; however, the single outer film 7a must be made wider for this purpose. Moreover, the adhesive seams must be designed in such a way that they actually elongate and possibly break (for two connecting points 9, i.e. for two outer films, the probability of a malfunction in this regard is lower).

As can also be seen in FIG. 3, a fleece 5, which is used for the adhesion of the resin 3b, is in turn laminated on the inner side of the outer film 7.

The outer film 7 of the outer tube system 7 in accordance with FIG. 3 also features at least one layer impermeable to UV radiation and (if applicable) at least near-UV visible light, preferably in the form of a laminated UV/light protection film, and preferentially at least one barrier layer against the passing through of components of the resin, whereas this barrier layer preferably contains polyamide.

The invention is not limited to the illustrated and described embodiments. Variations in the patent claims are possible, such as any combination of the described characteristics, even if they are illustrated and described in different parts of the description or the claims or in different embodiments.

The invention claimed is:

1. A tubular liner for sewer pipe rehabilitation, comprising:
    an inner tubular film;
    a resin-carrier layer surrounding the inner tubular film, wherein resin in the resin-carrier layer is curable by means of UV radiation;
    a protective outer film system surrounding the resin-carrier layer and comprising one outer film extending in a longitudinal direction of the tubular liner or a plurality of outer films connected together and extending in a longitudinal direction of the tubular liner, the one or plurality of outer films having longitudinal edges connected to each other in an overlapping manner in the circumferential direction of the tubular liner;
    a connecting junction between the overlapping longitudinal edges designed to expand and break upon a certain degree of circumferential expansion of the tubular liner in the sewer pipe to be rehabilitated;
    each of the one or plurality of outer films of the protective outer film system comprising a first layer made of a mechanically stable material that essentially does not elongate in the circumferential direction upon expansion of the tubular liner in the sewer pipe; and
    each of the one or plurality of outer films of the protective outer film system comprising a second layer that is laminated to the first layer and essentially impermeable to one or both of UV radiation or visible light;
    wherein the resin-carrier layer is surrounded by each of the first and second layers of the one outer film of the protective outer film system or the plurality of outer films of the protective outer film system.

2. The tubular liner according to claim 1, wherein the mechanically stable material comprises one or more of:
    a longitudinal tensile strength in accordance with DIN EN ISO 527-3 greater than 20 N/mm2;
    a transverse tensile strength in accordance with DIN EN ISO 527-3 greater than 20 N/mm2;
    an elongation at break in the longitudinal direction ($\epsilon$B) and elongation at break in the transverse direction ($\epsilon$B) in accordance with DIN EN ISO 527-3 less than 200;
    a resistance to further tears in a trapezoidal manner in a longitudinal direction or in a trapezoidal manner in a transverse direction in accordance with DIN 53363 greater than 100 N; and
    a puncture resistance in accordance with ASTM E 154 greater than 300 N.

3. The tubular liner according to claim 1, wherein the one or each of the plurality of outer films comprises one or more of:
    contains polyethylene (PE) or high density polyethylene (HDPE);
    contains at least one polyester;
    contains at least one polyamide;
    contains at least one, or a mixture or blend of, a rubber, hard rubber, gum, polystyrene, high impact polystyrene (HIPS), styrene-butadiene copolymer, acrylonitrile-butadiene-styrene-(ter) polymer (ABS), polycarbonate (PC), poly(meth)acrylate, or PVC;
    is formed as a reinforced film by one of a fabric, threads, fibers, grid, or mesh; or is formed as a reinforced fabric by one of a PVC-reinforced fabric or a Kevlar (aramid fiber) fabric.

4. The tubular liner according to claim 1, wherein the layer that is essentially impermeable to one or both of UV radiation or visible light inhibits UV radiation and visible light in a wave-length range of 300 to 500 nm at greater than 90% through addition of organic or inorganic color pigments and dyes and UV absorbers.

5. The tubular liner according to claim 4, wherein the second layer that is essentially impermeable to one or both of UV radiation is laminated on the side of the mechanically stable layer turned toward the resin-carrier layer.

6. The tubular liner according to claim 1, wherein the one or each of the plurality of outer films comprises a density in the range of 50 to 10,000 μm.

7. The tubular liner according to claim 1, wherein the connecting junction between the overlapping longitudinal edges is formed by one of a double-sided tape, a thermal welding seam, a hot-melt adhesive, or another adhesive in the form of a continuous adhesive seam or an interrupted adhesive application.

8. The tubular liner according to claim 1, further comprising a fleece material that is absorbent to liquid applied to an inner side of the one or each of the plurality of outer films.

9. The tubular liner according to claim 8, further comprising a wrapping film between the resin-carrier layer and the outer film system, the wrapping film connected to the fleece material.

10. The tubular liner according to claim 9, further comprising polyamide as a styrene barrier in one of the wrapping film or the outer film system.

11. The tubular liner according to claim 1, wherein the one or each of the plurality of outer films is a barrier material against components of the reactive resin.

12. The tubular liner according to claim 1, wherein the outer film system is formed of the plurality of outer films, a first one of the outer films extending a circumferential angular range greater than 180°.

13. The tubular liner according to claim 12, wherein an additional one of the plurality of outer films extends in a circumferential angular range of less than 180° and is placed from above on the first one of the outer films, the first and additional one of the outer films connected together at overlapping longitudinal edges.

14. The tubular liner according to claim 1, wherein the mechanically stable material comprises one or more of:
   a longitudinal tensile strength in accordance with DIN EN ISO 527-3 greater than 20 N/mm2;
   a transverse tensile strength in accordance with DIN EN ISO 527-3 greater than 20 N/mm2;
   an elongation at break in the longitudinal direction ($\epsilon B$) and elongation at break in the transverse direction ($\epsilon B$) in accordance with DIN EN ISO 527-3 less than 200;
   a resistance to further tears in a trapezoidal manner in a longitudinal direction or in a trapezoidal manner in a transverse direction in accordance with DIN 53363 greater than 200 N; and
   a puncture resistance in accordance with ASTM E 154 greater than 300 N.

15. The tubular liner according to claim 1, wherein the mechanically stable first layer is formed by a PVC coated fabric, and the second layer that is essentially impermeable to one or both of UV radiation or visible light is laminated to the mechanically stable first layer by adhesive lamination.

* * * * *